United States Patent
Zhu et al.

(10) Patent No.: US 11,834,055 B2
(45) Date of Patent: Dec. 5, 2023

(54) METHOD FOR SELECTING CONTENT FORWARDING NODE IN VEHICLE AD-HOC NETWORK ON THE BASIS OF SERVICE TYPE

(71) Applicant: NANJING UNIVERSITY OF POSTS AND TELECOMMUNICATIONS, Nanjing (CN)

(72) Inventors: Qi Zhu, Nanjing (CN); Yuanyuan Tang, Nanjing (CN); Hongbo Zhu, Nanjing (CN); Longxiang Yang, Nanjing (CN)

(73) Assignee: NANJING UNIVERSITY OF POSTS AND TELECOMMUNICATIONS, Nanjing (CN)

( * ) Notice: Subject to any disclaimer, the term of this patent is extended or adjusted under 35 U.S.C. 154(b) by 442 days.

(21) Appl. No.: 16/759,061

(22) PCT Filed: Jul. 4, 2019

(86) PCT No.: PCT/CN2019/094707
§ 371 (c)(1),
(2) Date: Apr. 12, 2021

(87) PCT Pub. No.: WO2020/186655
PCT Pub. Date: Sep. 24, 2020

(65) Prior Publication Data
US 2023/0219581 A1 Jul. 13, 2023

(30) Foreign Application Priority Data
Mar. 19, 2019 (CN) .......................... 201910207939.8

(51) Int. Cl.
*B60W 40/00* (2006.01)
*B60W 40/10* (2012.01)
(Continued)

(52) U.S. Cl.
CPC .......... *B60W 40/105* (2013.01); *H04W 84/18* (2013.01); *B60W 2554/4041* (2020.02); *B60W 2554/4049* (2020.02)

(58) Field of Classification Search
CPC ....... B60W 40/105; B60W 2554/4041; B60W 2554/4049; H04W 84/18; H04W 4/44;
(Continued)

(56) References Cited

U.S. PATENT DOCUMENTS 7,149,187 B1 * 12/2006 Jacobson ................ H04L 47/10
370/235
7,823,154 B2 * 10/2010 Wang ...................... G06F 3/067
718/102

(Continued)

FOREIGN PATENT DOCUMENTS

EP 2712781 A2 * 4/2014 .......... B60W 30/143
WO WO-0143347 A2 * 6/2001 .......... H04L 12/5693

*Primary Examiner* — Yonel Beaulieu
(74) *Attorney, Agent, or Firm* — CBM PATENT CONSULTING, LLC

(57) ABSTRACT

A method for selecting a content forwarding node in a vehicle ad-hoc network on the basis of service type, comprising the following steps: calculating a bandwidth occupation proportion factor according to the type of requested content information and a bandwidth occupation situation of a neighboring vehicle which can perform forwarding in a one-hop transmission range; defining a virtual arrival time of a candidate forwarding vehicle to an initial request vehicle according to the distance between the neighboring vehicle and the initial request vehicle and a driving speed of the neighboring vehicle; calculating a forwarding node impact factor according to the bandwidth occupation proportion factor and the virtual arrival time; and selecting a forwarding node according to the forwarding node impact factor.

7 Claims, 3 Drawing Sheets

(51) Int. Cl.
*H04W 84/00* (2009.01)
*H04W 84/18* (2009.01)
*B60W 40/105* (2012.01)

(58) Field of Classification Search
CPC ....... H04W 4/46; H04W 40/02; H04W 40/20; H04W 4/00; H04W 40/00
See application file for complete search history.

(56) References Cited

U.S. PATENT DOCUMENTS

| | | | | |
|---|---|---|---|---|
| 2003/0050954 | A1* | 3/2003 | Tayyar | H04L 67/63 718/102 |
| 2007/0064711 | A1* | 3/2007 | Wang | G06F 3/0605 370/395.4 |
| 2014/0088849 | A1* | 3/2014 | Ham | G06F 17/00 701/70 |
| 2016/0152232 | A1* | 6/2016 | Takahashi | B62D 5/0463 701/41 |
| 2023/0150507 | A1* | 5/2023 | Hiramatsu | B60W 50/0097 701/26 |

* cited by examiner

METHOD FOR SELECTING CONTENT FORWARDING NODE IN VEHICLE AD-HOC NETWORK ON THE BASIS OF SERVICE TYPE

TECHNICAL FIELD

The present invention relates to the technical field of communications, in particular to a method for selecting a content forwarding node in a vehicle ad-hoc network on the basis of service type.

BACKGROUND

A vehicle ad-hoc network (VANET), as a research direction of a mobile ad-hoc network (MANET), plays an important role in an intelligent transportation system (ITS). The VANET treats a vehicle node and a road infrastructure as network nodes, mainly realizes vehicle-to-vehicle communication (V2V) and vehicle-to-infrastructure communication (V2I), forms a real-time communication mobile network, and improves transportation safety and management efficiency, while providing more services for vehicle driving. Due to the high speed movement of vehicles, the VANET has the characteristic that the network topology frequently changes.

Under a VANET scenario, a general MANET protocol is easy to generate the problems such as network interruption, high latency, high packet loss rate and the like, and cannot satisfy a requirement for the VANET. Therefore, VANET protocol design becomes a research hotspot to solve the problems.

In VANETs, the network topology changes dramatically due to the high speed movement of vehicles. A vehicle which is in a communication range at the last moment may drive out of the communication range at the next moment, and thus the state of a communication link is unstable. A request information forwarding policy in VANETs is as follows: when request information arrives at a content vehicle, the vehicle would return content to an initial request vehicle along an original request information arrival path. However, due to the high speed movement of the vehicles, the vehicle participating in the transmission of the request information in the arrival path may have left the communication range when the content is returned, such that the communication link cannot be established, and the content may not smoothly arrive at the initial content request vehicle along the original path. A forwarding path returning to the initial request vehicle better than the original request information arrival path may exist.

Therefore, a novel technical solution is required to solve the above problem.

SUMMARY OF THE INVENTION

Object of the present invention: to overcome the defect in the prior art, the present invention provides a method for selecting a content forwarding node in a vehicle ad-hoc network on the basis of service type, and solves the problem how to dynamically select an appropriate content forwarding node according to a current network topology state and the type of service information to be transmitted, so as to achieve the objects of improving content arrival success rate, effectively utilizing limited channel resources, reducing transmission latency, and improving network performance.

Technical solution: to achieve the above object, the present invention provides a method for selecting a content forwarding node in a vehicle ad-hoc network on the basis of service type, comprising the following steps:

S1, calculating a bandwidth occupation proportion factor according to the type of requested content information and a bandwidth occupation situation of a neighboring vehicle which can perform forwarding in a one-hop transmission range;

S2, defining a virtual arrival time of a candidate forwarding vehicle to an initial request vehicle according to the distance between the neighboring vehicle and the initial request vehicle and a driving speed of the neighboring vehicle;

S3, calculating a forwarding node impact factor according to the bandwidth occupation proportion factor in step S1 and the virtual arrival time in step S2; and S4, selecting a forwarding node according to the forwarding node impact factor. Further, in step S1, the bandwidth occupation proportion factor is calculated as follows:

S1-1, a content vehicle y receives request information at time t, acquires the type of requested content according to a name of the requested content contained in the received request information, and determines an occupied bandwidth BW and occupied time $t_{need}$ required for transmitting the content;

S1-2, the vehicle y calculates an idle available bandwidth $BW_{free}(Vi)$ of a vehicle Vi; and $$K_i = \frac{BW_{free}(i) - BW}{BW_{total}}$$

S1-3, the vehicle y calculates the band occupation proportion factor of a vehicle i according to the determined BW, a total bandwidth $BW_{total}$ and the idle bandwidth of the neighboring vehicle, wherein i=(1, 2, . . . , N), and N is the total number of the neighboring vehicles of the vehicle y.

Further, in step S2, the virtual arrival time is defined as follows:

S2-1, candidate forwarding nodes are one-hop neighboring vehicles of the content vehicle y; the distance between the candidate forwarding vehicle and a target vehicle x is calculated by the formula $D_{(i,x)}=|X_i-X_x|$, wherein $X_i$ and $X_x$ are respectively the abscissas of the vehicles i and x, and the vehicle i is a neighboring vehicle of the vehicle y;

S2-2, according to different vehicle driving directions, when the driving directions of the vehicle i and the vehicle x are the same, if the speed $v_i$ of the vehicle i is less than the speed $v_x$ of the vehicle x, then the vehicle i is removed from the candidate forwarding nodes; and if the speed $v_i$ of the vehicle i is greater than the speed $v_x$ of the vehicle x, then the virtual arrival time is $$T_{(i,x)} = \frac{D_{(i,x)}}{v_i - v_x};$$

and when the driving directions of the vehicle i and the vehicle x are opposite, if the two vehicles get away from each other, then the vehicle i is removed from the candidate forwarding nodes; and if the two vehicles get close to each other, then the virtual arrival time is $$T_{(i,x)} = \frac{D_{(i,x)}}{v_i + v_x}.$$

Further, in step S3, the forwarding node impact factor is calculated with the following method: Let the number of the one-hop neighboring vehicles of the vehicle y be N, the vehicle i is one of the neighboring vehicles; a forwarding node vehicle i selection impact factor $F_i = \overline{K_i} - \overline{T_{(i,x)}}$ is calculated according to the bandwidth occupation proportion factor of the forwarding node and the virtual arrival time, wherein $\overline{K_i}$ and $\overline{T_{(i,x)}}$ are respectively normalized values of the bandwidth occupation proportion factor $K_i$ the virtual arrival time and denote the impact degrees of the bandwidth and moving speed of the candidate forwarding vehicle on forwarding vehicle selection; and $F_i$ denotes a successful selection probability of the forwarding node. For example, the factor −1 denotes that the impact factor is negatively correlated with the successful selection probability of the forwarding node.

Further, in step S4, the forwarding node is selected with the following method: selecting from the neighboring vehicles of the vehicle y a vehicle with the greatest impact factor as a forwarding node thereof; adding an ID of the vehicle, the required bandwidth, and the occupied time information to RFR information, transmitting out the RFR information; and updating the channel bandwidth idleness situation of the forwarding vehicle at the current time after the forwarding vehicle receives the RFR information.

Further, in step S4, after the vehicle receives the RFR information, the vehicle updates the channel bandwidth idleness situation thereof as follows:

S4-1, the vehicle receiving the RFR information first determines whether the vehicle is selected as the forwarding vehicle; if yes, then determining whether the idle bandwidth is greater than a bandwidth threshold value; and if no, then doing nothing;

S4-2, if the idle bandwidth is not greater than the bandwidth threshold value, then transmitting ACK information to inform that the vehicle cannot become the forwarding vehicle thereof; if the idle bandwidth is greater than the bandwidth threshold value, then continuing to determine whether the vehicle is selected by a plurality of content vehicles; if yes, then selecting the farthest content vehicle as the forwarding vehicle; and if not, then confirming that the vehicle becomes the forwarding vehicle; and S4-3, the forwarding vehicle transmits the ACK information to the content vehicle; the content vehicle receives the ACK information, and then transmits content information; and the forwarding vehicle receives and forwards the content information.

Further, in step S4-3, when the forwarding vehicle performs forwarding, the vehicle determines whether selection times exceeds a threshold value; if no, then jumping to step S1 after the forwarding; and if yes, then aborting the transmission of the content.

The basic thought of the present invention is: after a content vehicle receives request information, the content vehicle comprehensively selects a content forwarding node according to a neighboring vehicle available transmission bandwidth table maintained thereby and in combination with the factors such as vehicle position, driving direction, driving speed and the like; when the request information arrives at the content vehicle, the content vehicle first determines whether an initial request vehicle is in the communication range thereof; if yes, then content data information is directly transmitted; and if not, then the content vehicle determines a bandwidth required for the transmission according to the type of the requested content information, and calculates a bandwidth occupation proportion factor according to the bandwidth occupation situation of a neighboring vehicle which can perform forwarding in a one-hop transmission range; then, a virtual arrival time of a candidate forwarding vehicle to an initial request vehicle is defined according to the distance between the neighboring vehicle and the initial request vehicle and a driving speed of the neighboring vehicle; a candidate forwarding vehicle impact factor is calculated by comprehensively considering the bandwidth occupation proportion factor and the virtual arrival time; the content forwarding node is determined according to the impact factor; an ID of the determined forwarding vehicle, the required channel bandwidth, and the occupied time are added to RFR information; and after the forwarding vehicle receives the RFR information, the forwarding vehicle updates the channel bandwidth idleness situation thereof at the current time.

In the present invention, after the content vehicle receives the request information, the content vehicle needs to comprehensively select the content forwarding node according to the neighboring vehicle available transmission bandwidth table maintained thereby and in combination with the factors such as vehicle position, driving direction, driving speed and the like, thus improving transmission quality while ensuring that the content can arrive as soon as possible.

The present invention considers the feature that different service types in a vehicle ad-hoc network have different requirements for bandwidth, defines the bandwidth occupation proportion factor of the forwarding node, and defines the virtual arrival time of the forwarding node in combination with the feature of the vehicle ad-hoc network the topology changes quickly. By analyzing the two parameters of the forwarding node, the present invention obtains the impact factors of all the forwarding nodes available in next hop, and provides reference for the selection of the content information forwarding node.

The present invention selects the forwarding node according to the bandwidth occupation situation and the node position moving speed, can effectively avoid network latency due to network topology change, and improves the forwarding success rate of the content information.

Beneficial effects: compared with the prior art, the present invention has the following advantages:

1. The present invention considers the type of the transmitted service and the bandwidth occupation situation of the forwarding node, avoids the transmission failure due to a service bandwidth requirement, improves forwarding success rate, and reduces transmission latency.

2. The present invention considers the position information and speed information of the forwarding vehicle, and solves the problems that the forwarding node is easy to lose and the vehicle is easy to drive out of the one-hop communication range because the topology of the vehicle ad-hoc network changes quickly, thus improving the service information forwarding success rate. Furthermore, the present invention selects the forwarding node according to the speed of the vehicle, thus improving the service information forwarding speed, and reducing transmission latency.

DETAILED DESCRIPTION

Figure 1:
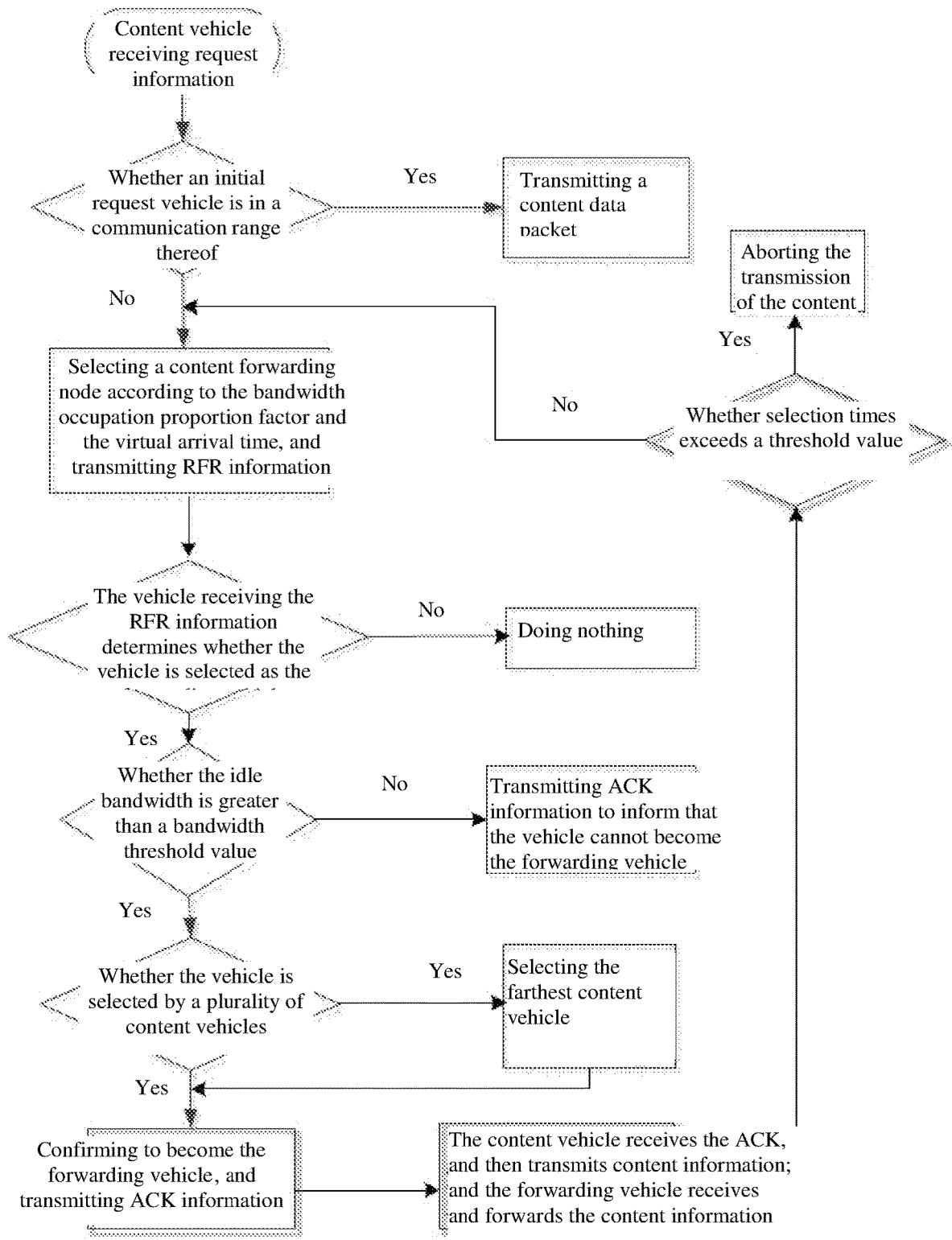
FIG. 1 is a flow chart of the method for selecting a content forwarding node in a vehicle ad-hoc network on the basis of service type.

The present invention will be further described hereafter in combination with the drawings and specific embodiments. The present invention provides a method for selecting a content forwarding node in a vehicle ad-hoc network on the basis of service type. As shown in FIG. 1, the overall flow thereof comprises the following steps:

1) A content vehicle receiving request information determines whether an initial request vehicle is in a communication range thereof; if yes, then directly transmitting a content data packet; and if not, then going to the next step.

2) Calculating a bandwidth occupation proportion factor according to the type of requested content information and a bandwidth occupation situation of a neighboring vehicle which can perform forwarding in a one-hop transmission range;

2.1) A content vehicle y receives request information at time t, acquires the type of requested content according to a name of the requested content contained in the received request information, and determines an occupied bandwidth BW and occupied time $t_{need}$ required for transmitting the content;

2.2) The vehicle y calculates an idle available bandwidth $BW_{free}(Vi)$ of a vehicle Vi; and 2.3) The vehicle y calculates the band occupation proportion factor $$K_i = \frac{BW_{free}(i) - BW}{BW_{total}}$$

of a vehicle i according to the determined BW, a total bandwidth $BW_{total}$ and the idle bandwidth of the neighboring vehicle, wherein i=(1, 2, . . . , N), and N is the total number of the neighboring vehicles of the vehicle y.

3) Defining a virtual arrival time of a candidate forwarding vehicle to the initial request vehicle according to the distance between the neighboring vehicle and the initial request vehicle and a driving speed of the neighboring vehicle; the definition method is specifically as follows:

3.1) Candidate forwarding nodes are one-hop neighboring vehicles of the content vehicle y; the distance between the candidate forwarding vehicle and a target vehicle x is calculated by the formula $D_{(i,x)}=|X_i-X_x|$ wherein $X_i$ and $X_x$ are respectively the abscissas of the vehicles i and x, and the vehicle i is a neighboring vehicle of the vehicle y;

3.2) According to different vehicle driving directions, when the driving directions of the vehicle i and the vehicle x are the same, if the speed $v_1$ of the vehicle i is less than the speed $v_x$ of the vehicle x, then the vehicle i is getting farther and farther from the vehicle x, and the vehicle i is removed from the candidate forwarding nodes; and if the speed $v_i$ of the vehicle i is greater than the speed $v_x$ of the vehicle x, then the virtual arrival time is $$T_{(i,x)} = \frac{D_{(i,x)}}{v_i - v_x};$$

and when the driving directions of the vehicle i and the vehicle x are opposite, if the two vehicles get away from each other, then the two vehicles cannot meet in the next period of time, and the vehicle i is removed from the candidate forwarding nodes; and if the two vehicles get close to each other, then the virtual arrival time is $$T_{(i,x)} = \frac{D_{(i,x)}}{v_i + v_x}.$$

4) Calculating a forwarding node impact factor according to the bandwidth occupation proportion factor in step S1 and the virtual arrival time in step S2: let the number of the one-hop neighboring vehicles of the vehicle y be N, the vehicle i is one of the neighboring vehicles; a forwarding node vehicle i selection impact factor $F_i=\overline{K_i}-\overline{T_{(i,x)}}$ is calculated according to the bandwidth occupation proportion factor of the forwarding node and the virtual arrival time, wherein $\overline{K_i}$ and $\overline{T_{(i,x)}}$ are respectively normalized values of the bandwidth occupation proportion factor $K_i$ and the virtual arrival time $$T_{(i,x)}; \overline{K_i} = \frac{K_i}{\sum_{k=1}^{N} K_k}, \overline{T_{(i,x)}} = \frac{T_{(i,x)}}{\sum_{k=1}^{N} T_{(i,x)}},$$

and denote the impact degrees of the bandwidth and moving speed of the candidate forwarding vehicle on forwarding vehicle selection; and $F_i$ denotes a successful selection probability of the forwarding node, for example, the factor −1 denotes that the impact factor is negatively correlated with the successful selection probability of the forwarding node.

Selecting from the neighboring vehicles of the vehicle y a vehicle with the greatest impact factor as a forwarding node thereof; adding an ID of the vehicle, the required bandwidth, and the occupied time information to RFR information, and transmitting out the RFR information.

6) The vehicle receiving the RFR information first determines whether the vehicle is selected as the forwarding vehicle; if yes, then determining whether the idle bandwidth is greater than a bandwidth threshold value; and if no, then doing nothing.

7) If the idle bandwidth is not greater than the bandwidth threshold value, then transmitting ACK information to inform that the vehicle cannot become the forwarding vehicle thereof; if the idle bandwidth is greater than the bandwidth threshold value, then continuing to determine whether the vehicle is selected by a plurality of content vehicles; if yes, then selecting the farthest content vehicle as the forwarding vehicle; and if not, then confirming that the vehicle becomes the forwarding vehicle.

8) The forwarding vehicle transmits the ACK information to the content vehicle; the content vehicle receives the ACK information, and then transmits content information; the forwarding vehicle receives and forwards the content information; when the forwarding vehicle performs forwarding, the vehicle determines whether selection times exceeds a threshold value; if no, then jumping to step S1 after the forwarding; and if yes, then aborting the transmission of the content.

According to the above method steps, the method steps of the present invention can be summarized as follows:

1. After a content vehicle receives request information, the content vehicle comprehensively selects a content forwarding node according to a neighboring vehicle available transmission bandwidth table maintained thereby and in combination with the factors such as vehicle position, driving direction, driving speed and the like;

2. When the request information arrives at the content vehicle, the content vehicle first determines whether an initial request vehicle is in the communication range thereof; if yes, then content data information is directly transmitted; and if not, then the content vehicle determines a bandwidth required for the transmission according to the type of the requested content information, and calculates a bandwidth occupation proportion factor according to the bandwidth occupation situation of a neighboring vehicle which can perform forwarding in a one-hop transmission range; then, a virtual arrival time of a candidate forwarding vehicle to an initial request vehicle is defined according to the distance between the neighboring vehicle and the initial request vehicle and a driving speed of the neighboring vehicle;

3. A candidate forwarding vehicle impact factor is calculated by comprehensively considering the bandwidth occupation proportion factor and the virtual arrival time; the content forwarding node is determined according to the impact factor; an ID of the determined forwarding vehicle, the required channel bandwidth, and the occupied time are added to RFR information; and after the forwarding vehicle receives the RFR information, the forwarding vehicle updates the channel bandwidth idleness situation thereof at the current time.

Figure 2:
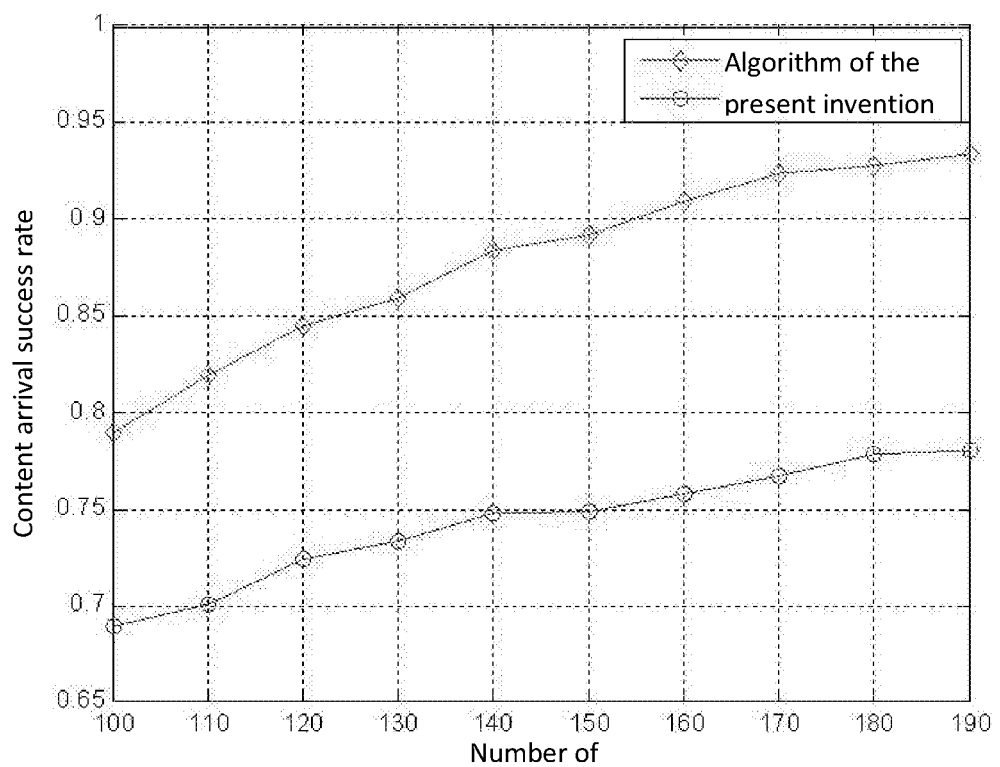
FIG. 2 is a schematic view for comparing two content information arrival success rates with the increase of the number of vehicles.

In the embodiment, the method of the present invention is compared with an existing method for returning content along an original path directly, and the specific result is as follows:

FIG. 2 shows a schematic view for comparing the content information arrival success rates of the two methods with the increase of the number of vehicles. It can be seen from FIG. 2 that the content arrival success rate of the method of the present invention is obviously higher than that of the method for returning content along an original path directly. The reason is: due to the movement of the vehicles in the network, during service returning, the vehicle forwarding the request information earlier may have moved out of the communication range, such that the communication link cannot be established to transmit the content information, thus having a low content arrival rate. The method for selecting a content forwarding node in the present invention avoids the content loss due to the movement of vehicles, considers the difference of service types, and further avoids the content transmission failure due to different bandwidth requirements, thus having a high success rate. With the increase of vehicles, the performance of the algorithm of the present invention is gradually improved; under the premise that the number of content requests remains unchanged, the more vehicles in the network, the more available forwarding vehicles, the higher the forwarding success rate is, and the higher the content arrival success rate is. With the increase of the number of vehicles in the range, the performance of the comparison algorithm of the existing method has a rising trend slower than the algorithm of the present invention because the increase of the number of vehicles cannot solve the problem of content transmission failure due to the movement of vehicles. Therefore, the content arrival success rate of the existing method is obviously lower than that of the present invention.

Figure 3:
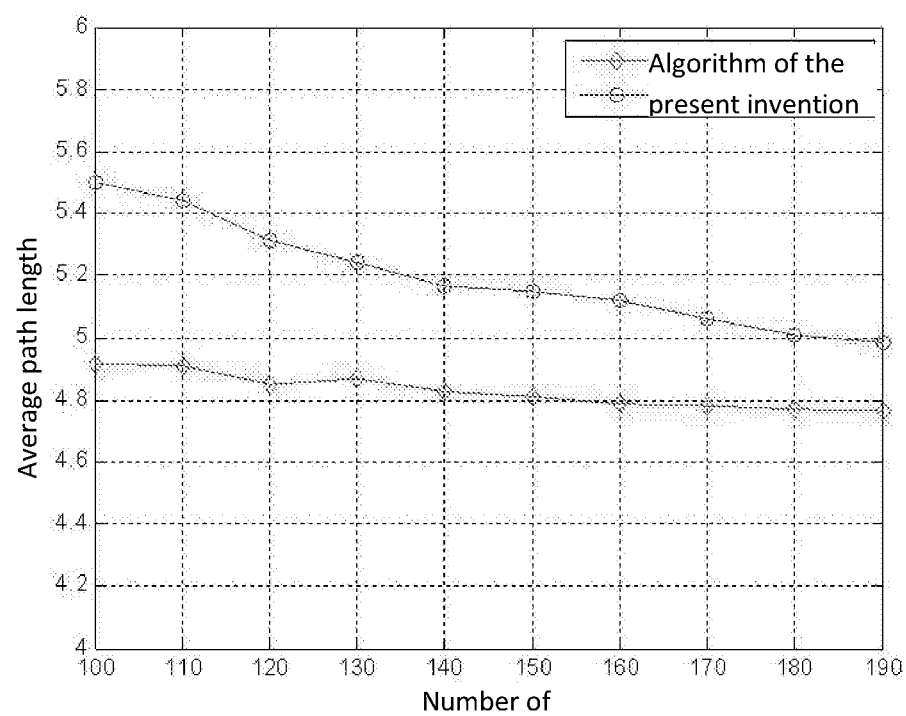
FIG. 3 is a schematic view for comparing two average path lengths required for successfully transmitting the information with the increase of the number of vehicles.

FIG. 3 shows a schematic view for comparing two average path lengths required for successfully transmitting the information with the increase of the number of vehicles. It can be seen that the average path length required for successfully transmitting the information according to the method of the present invention is less than that of the original path return method. Owing to the movement of vehicle nodes, a path better than the original path of the request information to the content vehicle may exist. The method of the present invention can find and utilize the better path, and the existing method can only return along the original path.

What is claimed is:

1. A method for selecting a content forwarding node in a vehicle ad-hoc network on the basis of service type, comprising a computer readable medium operable on a computer with memory for the method for selecting the content forwarding node in the vehicle ad-hoc network, and comprising program instructions for executing the following steps:

S1, calculating a bandwidth occupation proportion factor according to the type of requested content information and a bandwidth occupation situation of a neighboring vehicle which can perform forwarding in a one-hop transmission range;

S2, defining a virtual arrival time of a candidate forwarding vehicle to an initial request vehicle according to the distance between the neighboring vehicle and the initial request vehicle and a driving speed of the neighboring vehicle;

S3, calculating a forwarding node impact factor according to the bandwidth occupation proportion factor in step S1 and the virtual arrival time in step S2;

S4, selecting a forwarding node according to the forwarding node impact factor; and S5, operation of the vehicle ad-hoc network is controlled by the method of selecting the content forwarding node, which avoids network latency due to network topology change, forwards success rate, and reduces transmission latency.

2. The method according to claim 1, wherein in step S1, the bandwidth occupation proportion factor is calculated as follows:

S1-1, a content vehicle y receives request information at time t, acquires the type of requested content according to a name of the requested content contained in the received request information, and determines an occupied bandwidth BW and occupied time $t_{need}$ required for transmitting the content;

S1-2, the vehicle y calculates an idle available bandwidth $BW_{free}$, ($V_i$) of a vehicle Vi; and S1-3, the vehicle y calculates the band occupation proportion factor $$K_i = \frac{BW_{free}(i) - BW}{BW_{total}}$$

of a vehicle i according to the determined BW, a total bandwidth $BW_{total}$ and the idle bandwidth of the neighboring vehicle, wherein i=(1, 2, . . . , N), and N is the total number of the neighboring vehicles of the vehicle y.

3. The method according to claim 1, wherein in step S2, the virtual arrival time is defined as follows:

S2-1, candidate forwarding nodes are one-hop neighboring vehicles of the content vehicle y; the distance between the candidate forwarding vehicle and a target vehicle x is calculated by the formula $D_{(i,x)}=|X_i-X_x|$, wherein $X_i$ and $X_x$ are respectively the abscissas of the vehicles i and x, and the vehicle i is a neighboring vehicle of the vehicle y;

S2-2, according to different vehicle driving directions, when the driving directions of the vehicle i and the vehicle x are the same, if the speed $v_i$ of the vehicle i is less than the speed $v_x$ of the vehicle x, then the vehicle i is removed from the candidate forwarding nodes; and if the speed $v_i$ of the vehicle i is greater than the speed $v_x$ of the vehicle x, then the virtual arrival time is $$T_{(i,x)} = \frac{D_{(i,x)}}{v_i - v_x};$$

and when the driving directions of the vehicle i and the vehicle x are opposite, if the two vehicles get away from each other, then the vehicle i is removed from the candidate forwarding nodes; and if the two vehicles get close to each other, then the virtual arrival time is $$T_{(i,x)} = \frac{D_{(i,x)}}{v_i + v_x}.$$

4. The method according to claim 1, wherein in step S3, the forwarding node impact factor is calculated with the following method:

let the number of the one-hop neighboring vehicles of the vehicle y be N, the vehicle i is one of the neighboring vehicles; a forwarding node vehicle i selection impact factor $F_i = \overline{K_i} - \overline{T_{(i,x)}}$ is calculated according to the bandwidth occupation proportion factor of the forwarding node and the virtual arrival time, wherein $\overline{K_i}$ and $\overline{T_{(i,x)}}$ are respectively normalized values of the bandwidth occupation proportion factor $K_i$ and the virtual arrival time $T_{(i,x)}$, and denote the impact degrees of the bandwidth and moving speed of the candidate forwarding vehicle on forwarding vehicle selection; and $F_i$ denotes a successful selection probability of the forwarding node.

5. The method according to claim 1, wherein in step S4, the forwarding node is selected with the following method: selecting from the neighboring vehicles of the vehicle y a vehicle with the greatest impact factor as a forwarding node thereof; packaging an ID of the vehicle, the required bandwidth, and the occupied time information as a Request For Relay (RFR) information, transmitting out the RFR information; and updating the channel bandwidth idleness situation of the forwarding vehicle at the current time after the forwarding vehicle receives the RFR information.

6. The method according to claim 5, wherein in step S4, after the vehicle receives the RFR information, the vehicle updates the channel bandwidth idleness situation thereof as follows:

S4-1, the vehicle receiving the RFR information first determines whether the vehicle is selected as the forwarding vehicle; if yes, then determining whether the idle bandwidth is greater than a bandwidth threshold value; and if no, then doing nothing;

S4-2, if the idle bandwidth is not greater than the bandwidth threshold value, then transmitting ACK information to inform that the vehicle cannot become the forwarding vehicle thereof; if the idle bandwidth is greater than the bandwidth threshold value, then continuing to determine whether the vehicle is selected by a plurality of content vehicles; if yes, then selecting the farthest content vehicle as the forwarding vehicle; and if not, then confirming that the vehicle becomes the forwarding vehicle; and S4-3, the forwarding vehicle transmits the ACK information to the content vehicle; the content vehicle receives the ACK information, and then transmits content information; and the forwarding vehicle receives and forwards the content information.

7. The method according to claim 6, wherein in step S4-3, when the forwarding vehicle performs forwarding, the vehicle determines whether selection times exceeds a threshold value; if no, then jumping to step S1 after the forwarding; and if yes, then aborting the transmission of the content.

* * * * *